US011502936B2

(12) United States Patent
Zad Tootaghaj et al.

(10) Patent No.: US 11,502,936 B2
(45) Date of Patent: Nov. 15, 2022

(54) HEURISTIC-BASED SD-WAN ROUTE RECONFIGURATION

(71) Applicant: HEWLETT PACKARD ENTERPRISE DEVELOPMENT LP, Houston, TX (US)

(72) Inventors: Diman Zad Tootaghaj, Milpitas, CA (US); Puneet Sharma, Milpitas, CA (US); Faraz Ahmed, Milpitas, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/282,941

(22) PCT Filed: Apr. 18, 2019

(86) PCT No.: PCT/US2019/028058
§ 371 (c)(1),
(2) Date: Apr. 5, 2021

(87) PCT Pub. No.: WO2020/214173
PCT Pub. Date: Oct. 22, 2020

(65) Prior Publication Data
US 2021/0392070 A1    Dec. 16, 2021

(51) Int. Cl.
*H04L 45/125*    (2022.01)
*H04L 43/0852*    (2022.01)
(Continued)

(52) U.S. Cl.
CPC ........ *H04L 45/125* (2013.01); *H04L 43/0858* (2013.01); *H04L 43/0882* (2013.01);
(Continued)

(58) Field of Classification Search
CPC ............... H04L 45/125; H04L 43/0858; H04L 43/0882; H04L 45/121; H04L 45/124; H04L 45/38; H04L 45/64; H04L 47/12
(Continued)

(56) References Cited

U.S. PATENT DOCUMENTS 7,453,796 B2    11/2008    Alicherry et al.
8,699,350 B1 *    4/2014    Kumar .................... H04L 45/18
370/252
(Continued)

FOREIGN PATENT DOCUMENTS

KR    20170110105    10/2017

OTHER PUBLICATIONS

Geeksforgeeks, "Travelling Salesman Problem, Set 2 (Approximate Using MST)," retrieved online Mar. 16, 2019, http://www.geeksforgeeks.org/travelling-salesman-problem-set-2-approximate-using-mst/.
(Continued)

*Primary Examiner* — Hermon Asres
(74) *Attorney, Agent, or Firm* — Hewlett Packard Enterprise Patent Department

(57) ABSTRACT

An example network orchestrator includes processing circuitry and a memory. The memory includes instructions that cause the network orchestrator to receive network probe information including delay times of network probes associated with a set of flows between devices. The instructions further cause the network orchestrator to generate a correlation matrix including correlations representing shared congested links between pairs of flows. The instructions further cause the network orchestrator to for each flow of the set of flows, determine a routing solution optimized for the each flow and select a total minimum cost solution from the determined routing solutions.

14 Claims, 5 Drawing Sheets

(51) Int. Cl.
*H04L 43/0882* (2022.01)
*H04L 45/121* (2022.01)
*H04L 45/12* (2022.01)
*H04L 45/00* (2022.01)
*H04L 45/64* (2022.01)
*H04L 47/12* (2022.01)

(52) U.S. Cl.
CPC .......... *H04L 45/121* (2013.01); *H04L 45/124* (2013.01); *H04L 45/38* (2013.01); *H04L 45/64* (2013.01); *H04L 47/12* (2013.01)

(58) Field of Classification Search
USPC .......................................................... 709/238
See application file for complete search history.

(56) References Cited

U.S. PATENT DOCUMENTS

| | | | |
|---|---|---|---|
| 9,590,892 | B2 | 3/2017 | Shah Heydari et al. |
| 9,960,954 | B2 | 5/2018 | Chandangoudar |
| 10,020,880 | B2 | 7/2018 | Gupta et al. |
| 10,516,578 | B2 | 12/2019 | Fraenkel et al. |
| 2015/0163114 | A1* | 6/2015 | Hsiao .................. H04L 43/0864 370/252 |
| 2015/0195136 | A1 | 7/2015 | Mermoud et al. |
| 2017/0195255 | A1 | 7/2017 | Pham et al. |
| 2017/0237654 | A1 | 8/2017 | Turner et al. |
| 2017/0288945 | A1* | 10/2017 | Chandangoudar .......................... H04L 41/0631 |
| 2018/0309664 | A1* | 10/2018 | Balasubramanian ........................ H04L 47/122 |
| 2018/0337845 | A1 | 11/2018 | Matsunaga |

OTHER PUBLICATIONS

Wu, B. Y. et al., "Approximation Algorithms For Some Optimum Communication Spanning Tree Problems," Jun. 15, 2000, 22 pages, http://www.ac.els-cdn.com/S0168218X99002127/1-s2.0-S0166218X99002127-main.pdf?_tid=7416d656-6bcd-4181-9052-52527de2bc08&acdnat=1552507152_5908c334a7ff3efaa53e3ab0ea93d686.

Wu, B. Y., "Approximation Algorithms for the Optimal p-source Communication Spanning Tree," 2004, 12 pages, http://www.core.ac.uk/download/pdf/82111250.pdf.

Adams et al., "The Use of End-to-end Multicast Measurements for Characterizing Internal Network Behavior", IEEE Communications Magazine, Oct. 1999, 11 pages.

Andersen et al., "Resilient Overlay Networks", ACM, 2001, 15 pages.

Duan et al., "Service Overlay Networks: SLAs, QoS, and Bandwidth Provisioning", IEEE/ACM Transactions on Networking,, vol. 11, No. 6, Dec. 2003, 14 pages.

Feamster et al., "Measuring the Effects of Internet Path Faults on Reactive Routing", SIGMETRICS'03, ACM, Jun. 10-14, 2003, 13 Pages.

Johnson et al., "The Complexity of the Network Design Problem", Networks, vol. 8, 1978, 7 pages.

Knight et al., "The Internet Topology Zoo", IEEE Journal on Selected Areas in Communications, 2011, 12 pages.

Knight et al., "The Internet Topology Zoo", May 2015, 12 pages.

Lerner et al., "Technology Overview for SD-WAN", Gartner, Jul. 2, 2015, 13 pages.

Luckie et al., "Challenges in Inferring Internet Interdomain Congestion", ACM, Nov. 5-7, 2014, 7 pages.

Papaemmanouil et al., "Application-aware Overlay Networks for Data Dissemination", In Proceedings. 22nd International Conference on Data Engineering Workshops, 2006, 8 pages.

Paxson, Vern, "End-to-End Routing Behavior in the Internet", IEEE/ACM transactions on Networking, 1997, 14 pages.

Stallings et al., "SNMP and SNMPv2: The Infrastructure for Network Management", IEEE Communications Magazine, Mar. 1998, 7 pages.

Tootaghaj et al. ,"Parsimonious Tomography: Optimizing Cost-Identifiability Trade-off for Probing-based Network Monitoring", In ACM SIGMETRICS Performance Evaluation Review, Mar. 2018, 14 pages.

Tootaghaj et al., "Controlling Cascading Failures in Interdependent Networks under Incomplete Knowledge", IEEE Proceedings of the International Symposium on Reliable Distributed Systems (IEEE SRDS 2017), 2017, 11 pages.

Tootaghaj et al., "Network Recovery from Massive Failures under Uncertain Knowledge of Damages", Conference Paper, IFIP, Jun. 2017, 10 pages.

Wong et al., "Worst-Case Analysis of Network Design Problem Heuristics", In SIAM Journal on Algebraic and Discrete Methods, Mar. 1980, 35 pages.

Wu et al., "A Polynomial Time Approximation Scheme for Minimum Routing Cost Spanning Trees", In SIAM Journal on Computing, Jan. 1999, 19 pages.

Wu et al., "Spanning Trees and Optimization Problems", CRC Press, 2004, 18 pages.

\* cited by examiner

HEURISTIC-BASED SD-WAN ROUTE RECONFIGURATION

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and head-end gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and head-end gateways) controls certain aspects of routing for their respective LAN, but a network orchestrator controls the overall switching and routing across the WAN.

In some WANs, SD-WAN routes may traverse portions of the WAN that are not software-defined networking (SDN) enabled and/or are outside of the administrative domain of the WAN owner (e.g. the Internet). In such WANs, it is helpful to conceptualize the SD-WAN in two layers, a software defined overlay network and a physical underlay network. Much of the complexity of the physical underlay network may be hidden from the controller of the software defined overlay network. For example, two overlay network adjacent SD-WAN devices, such as a branch gateway and a headend gateway at different WAN sites may span a large number of physical underlay devices, such as any number of Internet infrastructure devices.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
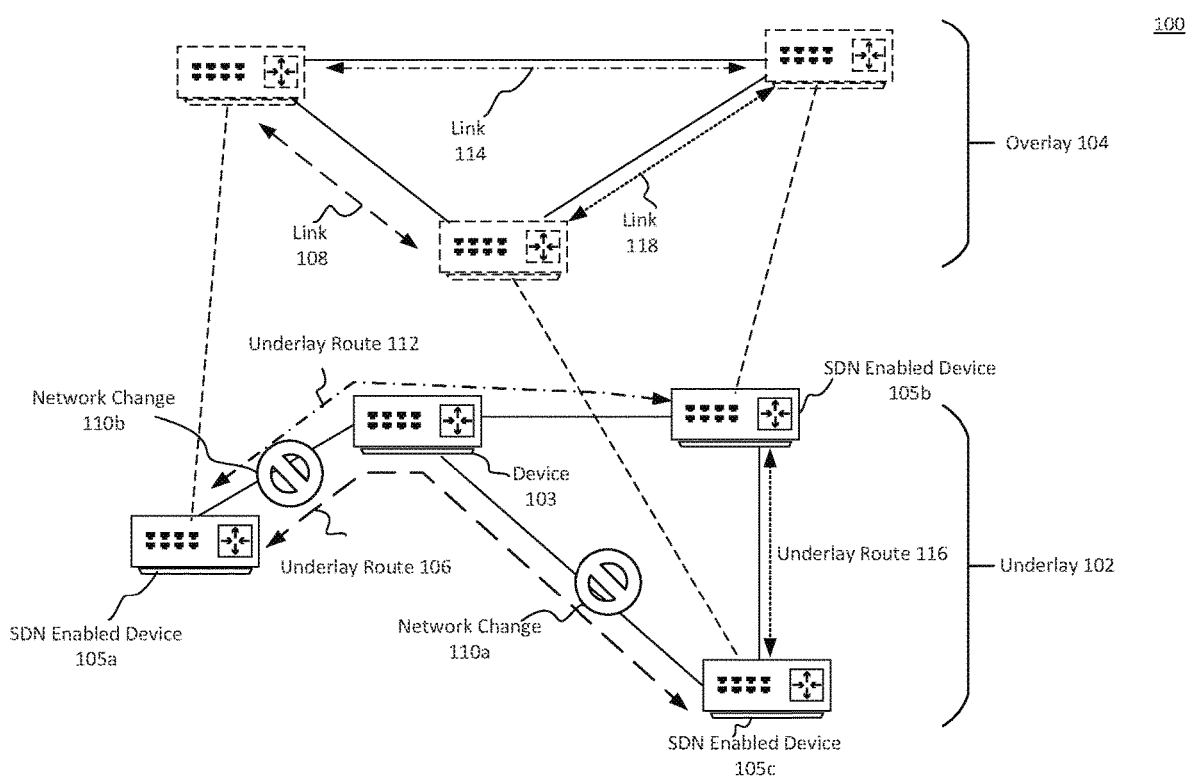
FIG. 1 illustrates an example software defined wide area network (SD-WAN) reconfiguring a route.

Certain examples have features that are in addition to or in lieu of the features illustrated in the above-referenced figures. Certain labels may be omitted from certain figures for the sake of clarity.

DETAILED DESCRIPTION

In multi-site wide area networks (WANs), it is common to use non-dedicated public routes provided by Internet service providers (ISPs), such as DSL or other broadband Internet connections, to connect sites of the WAN at a lower cost than dedicated links, such as MPLS. Commonly, enterprises deploy software defined WANs (SD-WANs) to manage security, availability, and routing across the public network connections/links. However, since the links across the public routes are not owned by the enterprise (they are usually provided by an ISP), visibility into the routing details of those public routes may be limited due to the administrative boundary between the enterprise WAN and the ISP-offered Internet.

One consequence of this lack of administrative control over the public routes is that a SD-WAN link between two sites may be represented in the SD-WAN overlay as a single direct link between a branch gateway of the first site and a headend gateway of the second site (in topologies where the first site is a branch site and the second site is a core site). However, in the physical underlay network, the branch gateway and the headend gateway may be separated by any number of ISP controlled network infrastructure devices. This can cause significant routing issues when there is a failure in a route across the physical underlay network that is not administratively controlled by the owner of the enterprise SD-WAN.

As a simple example, we will examine a three site SD-WAN. There are two branch sites, Branch A and Branch B. There is also a core datacenter, Site DC. The SD-WAN overlay topology of the sites is in a fully connected mesh triangular pattern. Each of the branch sites have a bidirectional WAN link with Site DC, and there is a bidirectional WAN link between Branch A and Branch B. If a device on Branch A wants to communicate with a server on Site DC, the most efficient path is to send the data packets through the WAN link connecting Branch A to Site DC (represented as A⇆DC). However, if an ISP router along the A⇆DC link is experiencing performance degradation due to congestion, a network orchestrator for the SD-WAN may attempt to route the data packets differently to improve WAN performance. The only other available SD-WAN route is to use the A⇆B link and then the B⇆DC link. An issue arises if, for example, the ISP router experiencing performance degradation happens to also be in the route used by the B⇆DC link. The network orchestrator just traded out a poorly performing WAN link for an even poorer performing WAN link.

Simply finding the most efficient path across the SD-WAN (overlay network) to the destination isn't the only concern. Physical links have business costs associated with them, and the costs for each link can conform to one of a number of models. For example, an ISP may charge a flat monthly rate for a DSL link between two WAN sites. In another model, the ISP may charge a flat monthly rate for the DSL link as long as monthly bandwidth usage is less than 100 GB, and then charge a per-GB rate for all data transacted over 100 GB. In yet another model, the ISP may only charge a per-GB rate for usage of the link.

A cost-conscious network administrator may prefer to route network traffic in a way that costs the least while still maintaining quality of service (QoS) requirements for each type of network traffic. For example, routing streaming video traffic through the cheapest and lowest QoS route may cost less than routing the streaming video traffic through a more expensive route, but the cheapest route may violate QoS requirements for the streaming video traffic.

In this disclosure, a two phase process infers underlay physical network topologies of a SD-WAN and determines a minimum cost routing solution constrained by QoS requirements and physical link limitations for all SD-WAN flows. One example consistent with this disclosure is a linear integer programming formulation which can be solved using different ILP (integer linear programming) optimization toolkits such as gurobi or CPLEX. Since this problem formulation is NP-Hard and intractable for large networks, examples consistent with this disclosure include a greedy and a heuristic approach to solve it in a timely manner.

In the first phase, software defined networking (SDN) enabled network infrastructure devices of the SD-WAN may send network probes across certain SD-WAN links to determine delay times for the certain SD-WAN links. Some links may include multiple interfaces, such as when multiple redundant uplinks connect a pair of SD-WAN sites using multiple ISPs, communication technologies, or combinations thereof. The delay times are then received at the network orchestrator. The network orchestrator then determines a correlation between each pair of SD-WAN links. In some examples, the correlation corresponds to whether the pair of SD-WAN links shares a congested physical link, like the ISP router described in paragraph 0014. However, the correlation may also capture additional relationships, such as when a pair of SD-WAN links does not share a congested physical link, but each link of the pair of SD-WAN links shares a congested physical link with a third SD-WAN link. For example, referring back to the simple three site SD-WAN in paragraph 0014, a pair of SD-WAN links may have a high positive correlation in the following scenario. SD-WAN link A⇆DC passes through ISP router R1 and SD-WAN link B⇆DC passes through ISP router R2. SD-WAN link A⇆B (which is not part of the pair being correlated) passes through both ISP router R1 and ISP router R2 and the traffic between Branch A and Branch B is enough to cause congestion on both ISP routers R1 and R2. In this situation, both A⇆DC and B⇆DC would show similar delay patterns (and thus have high positive correlation with one another) due to the use of bandwidth from A⇆B. A⇆DC because it shares ISP Router R1 with A⇆B, and B⇆DC because it shares ISP Router R2 with A⇆B.

Treating direct correlations (when the pair of SD-WAN links shares a congested physical link) and indirect correlations (when the pair of SD-WAN links each independently share a congested physical link with a third SD-WAN link) the same results in similar improvements to efficiency of the network as when indirect correlations are filtered out, so correlations can be treated the same regardless of whether they are direct or indirect.

In some examples, the correlations are calculated using a linear regression algorithm on time-series delay information for each flow. The network orchestrator may request periodic delay information from the SDN enabled network infrastructure devices of the SD-WAN. For example, the SDN enabled network infrastructure devices may send a set of network probes every 5 minutes for all SD-WAN links originating at the respective network infrastructure device. Each network infrastructure device may then receive replies from terminating devices for each respective SD-WAN link including the delay time in receiving the respective network probe. The originating network infrastructure devices would then transmit the delay times for all network probes to the network orchestrator, each delay time tagged with their respective SD-WAN link. Alternatively, the terminating devices could directly send the delay times to the network orchestrator in lieu of sending a reply to the originating device.

The network orchestrator may also request delay information when a change is detected in the network. For example, if QoS requirements are reported as not being met for a certain flow, the network orchestrator may request delay information for SD-WAN links routing that flow, or for all SD-WAN links. As another example, if a SD-WAN link is reported to no longer be operational, the network orchestrator may request delay information for all SD-WAN links.

In the second phase, the network orchestrator determines and implements a reconfigured network topology to optimize for minimum operational cost while still respecting QoS requirements (such as a per-flow maximum correlation) and network infrastructure device and underlying physical networks' capacity limitations. The per-flow maximum correlation increases path disjointness, which may improve network resiliency. The route reconfiguration process may be initiated periodically, by a detected performance degradation at some underlay device or link, by a network topology change (e.g. device or link failures, underlay reconfigurations, additions of devices or links), and by new flows or services being initiated on the network, among other triggers.

For each flow of the SD-WAN, the network orchestrator calculates a routing solution optimized for the flow. The network orchestrator then determines an optimal routing solution (the total minimum cost routing solution) from the routing solutions optimized for each flow.

In some examples, each routing solution is iteratively determined using a flow order generated so that the optimized flow is first in the flow order. For each iteration, an algorithm selects a least costly path that satisfies the flow's QoS requirements and doesn't overtax any of the network interface devices. Then, based on the selected least costly path, a model of the network used for this analysis is updated to account for the current flow being routed along the selected path. For example, referring back to the network in paragraph 0014, if Flow 1 has a least cost path from A⇆DC and DC⇆B, the model of the SD-WAN network maintained by the network orchestrator for the purpose of calculating routing solutions would be updated to reduce the available bandwidth of A⇆DC and DC⇆B by the expected amount of bandwidth used by Flow 1. Then, a least cost path for the next flow (e.g. Flow 2) is calculated using the updated model of the SD-WAN network.

Once each flow from the flow order has had a least costly path selected, the routing solution is complete. The network orchestrator proceeds to generate a new flow order optimizing for a different flow, and calculates a routing solution calculated optimizing for each flow of the SD-WAN, the network orchestrator selects a total minimum cost routing solution based on a minimum total operational cost when comparing total operational costs of each routing solution. The total minimum cost routing solution is then implemented by sending flow rules to SD-WAN infrastructure devices that modify their routing behaviors to be congruent with the total minimum cost routing solution.

The features of this disclosure improve network routing and switching by reducing operational cost of a SD-WAN when the network reconfigures after a change in network topology. The features of this disclosure also reduce the number of flows disrupted when network conditions degrade, resulting in lower latency, jitter, and other characteristics of poor network conditions. The features of this disclosure further reduce the amount of manual tuning of a network by a network administrator, as commonly required in many networks.

FIG. 1 illustrates an example software defined wide area network (SD-WAN) reconfiguring a route. SD-WAN 100 is a network of infrastructure devices 103, some of which are SDN enabled 105. The network is conceptualized as having two layers, an underlay 102 and an overlay 104. Overlay 104 is an abstraction of the physical network shown in underlay 102. Overlay 104 includes only SDN enabled devices 105, and other devices 103 are abstracted away because a SD-WAN controller (such as a network orchestrator) may not be able to directly control the behavior of the other devices 103.

A network orchestrator with information about the topology of overlay 104 may not be able to determine the topology of underlay 102 solely based on overlay 104 topology information. For example, even though the link associated with overlay flow 108 is shown in overlay 104 as a single direct link between SDN enable devices, underlay 102 shows that there is an intervening device 103 along underlay route 106.

The network orchestrator generates flows to forward traffic between SDN enabled devices 105. However, these flows are reflected in more complex routes in underlay 102. For example, a flow routed across SD-WAN link 108 in overlay 104 is routed across underlay route 106 in underlay 102, a flow routed across SD-WAN link 114 is routed across underlay route 112, and a flow routed across SD-WAN link 118 is routed across underlay route 116. Although SD-WAN links 108 and 114 appear to be entirely disjoint in overlay 104, underlay routes 106 and 112 share a physical link, specifically the link between SDN enabled device 105a and device 103.

The network orchestrator may configure SDN enabled devices 105 to periodically transmit network probes across each SD-WAN link 108, 114, and 118. For example, SDN enabled device 105a may transmit network probes that follow underlay route 106 and underlay route 112. The network probes may be, for example, internet control message protocol (ICMP) messages. The network probes include a transmission time, and when received at the SDN enabled device 105 terminating the respective SD-WAN link, a delay time is determined by subtracting the transmission time from the reception time. In some examples, the SDN enabled device 105 terminating the SD-WAN link sends a reply message to the originating SDN enabled device 105 including the delay time. In some other examples, the terminating SDN enabled device 105 may directly send the delay time to the network orchestrator. At a cadence specified by the network orchestrator, SDN enabled devices 105 forward the delay times to the network orchestrator, tagged with the respective SD-WAN links that they are assigned to.

As an example operation of the network probe, the network orchestrator requests network probes be sent for SD-WAN link 108. SDN enabled device 105a, as the originating infrastructure device of SD-WAN link 108, generates a number of network probes (the number may be configured by the network orchestrator) with transmission timestamps, and forwards them along underlay route 106. When the network probes are received at SDN enabled device 105c, delay times are calculated by subtracting the transmission timestamp for each network probe from the received time for each network probe. In some examples, SDN enabled device 105c generates a reply (either a single reply for all network probes in the series of network probes, or a reply for each network probe) that includes delay times for each network probe and transmits the reply to SDN enabled device 105a. In some other examples, SDN enabled device 105c transmits the delay times, along with additional information, such as the transmission timestamps, network probe ID information, and SD-WAN link information, to the network orchestrator.

Once the network orchestrator receives network probe information from SDN enabled devices 105, the network orchestrator can analyze time-series data about network behavior for each of the SD-WAN links of SD-WAN 100. The network orchestrator may analyze data across pairs of SD-WAN links for correlation. For example, the network orchestrator may execute a linear regression analysis between each pair of SD-WAN links to determine whether their delay data is correlated. Correlation between pairs of SD-WAN links may indicate direct or indirect shared congested underlay links. For example, if network change 110a is congestion across the link between device 103 and device 105c, delay times for network probes assigned to SD-WAN link 108 may increase (because associated underlay route 106 passes through the congested link), but delay times for network probes assigned to SD-WAN link 114 may not increase (because associated underlay route 112 does not pass through the congested link). This will result in a reduced correlation between SD-WAN link 108 and SD-WAN link 114. However, if network change 110b is congestion across the link between device 105a and device 103, delay times for network probes assigned to SD-WAN link 108 may increase (because associated underlay route 106 passes through the congested link) and delay times for network probes assigned to SD-WAN link 114 may increase (because associated underlay route 112 also passes through the congested link). This will result in an increased correlation between SD-WAN links 108 and 114.

Correlation information can be used to make routing decisions. For example, if network change 110a is causing packets of flow routed across SD-WAN link 108 to violate quality of service (QoS) requirements, the network orchestrator may determine, due to a low correlation between SD-WAN links 108 and 114, that network change 110a can be bypassed by moving flows routed across SD-WAN link 108 to instead use SD-WAN link 114 and SD-WAN link 118 to reach SDN enabled device 105c. As another example, if network change 110b is causing packets of flow routed through SD-WAN link 108 to violate quality of service (QoS) requirements, the network orchestrator may determine, due to a high correlation between SD-WAN links 108 and 114, that network change 110b cannot be bypassed by moving flow routed across SD-WAN link 108 to SD-WAN link 114, since underlay route 112 also uses the link affected by network change 110b. Flows routed across SD-WAN link 108 may be worse off being routed around underlay route 112 rather than staying with underlay route 106. In FIG. 1, as well as in the rest of this disclosure, SD-WAN links are shown as unidirectional data paths.

Figure 2:
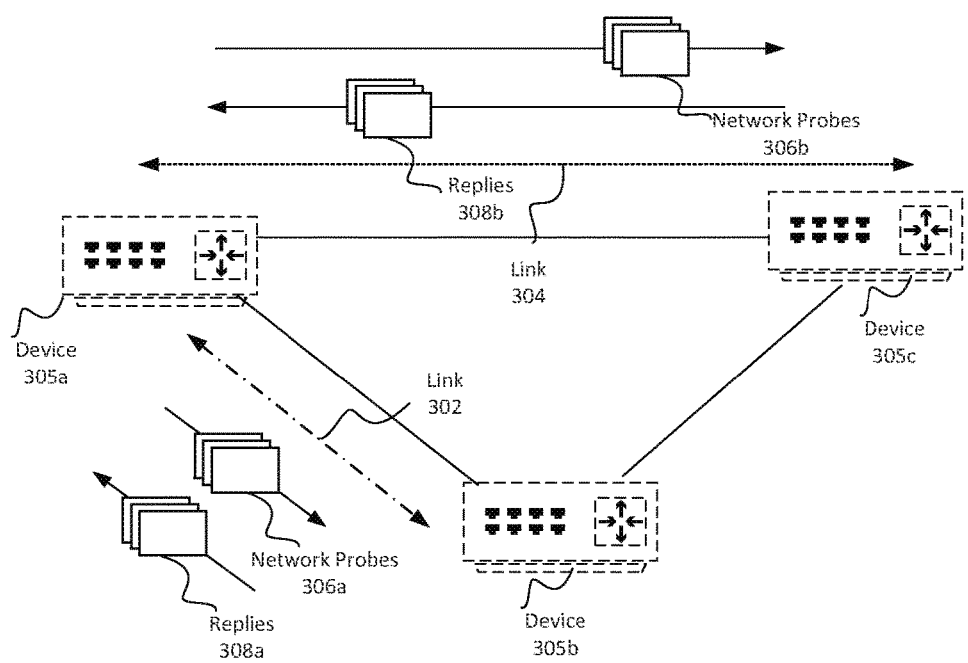
FIG. 2 illustrates an example SD-WAN gathering delay times using network probes.

FIG. 2 illustrates an example SD-WAN gathering delay times using network probes. FIG. 2 illustrates the overlay of SD-WAN 100, including SD-WAN links 302 and 304.

At a cadence set by the network orchestrator, certain overlay devices of SD-WAN 100 send network probes across SD-WAN links 302. For example, originating device 305a transmits network probes 306a along the physical route of SD-WAN link 302 to terminating device 305b. Each network probe 306a includes a transmission timestamp when originating device 305a transmits the respective network probe 306a. When received at terminating device 305b, the terminating device 305b includes a reception timestamp. In some examples, terminating device 305b determines a delay time for each network probe 306a. In some other examples, terminating device 305b merely forwards transmission timestamps and reception timestamps to the network orchestrator for determination of the delay time for each network probe 306a.

In some examples, terminating device 305b transmits one or more replies 308a to originating device 305a including the delay time for each network probe 306a. In some other examples, terminating device 305b forwards the delay time information to the network orchestrator.

A similar process occurs for network probes 306b (forwarded across SD-WAN link 304) and replies 308b. The network orchestrator eventually receives all of the delay time information for both SD-WAN links 302 and 304 and determines, based on time-series delay time information for each respective SD-WAN link, a correlation between SD-WAN link 302 and SD-WAN link 304.

Although FIG. 2 only shows network probes passing one direction through each respective SD-WAN link, this disclosure contemplates bidirectional probing across links, as well.

Figure 3:
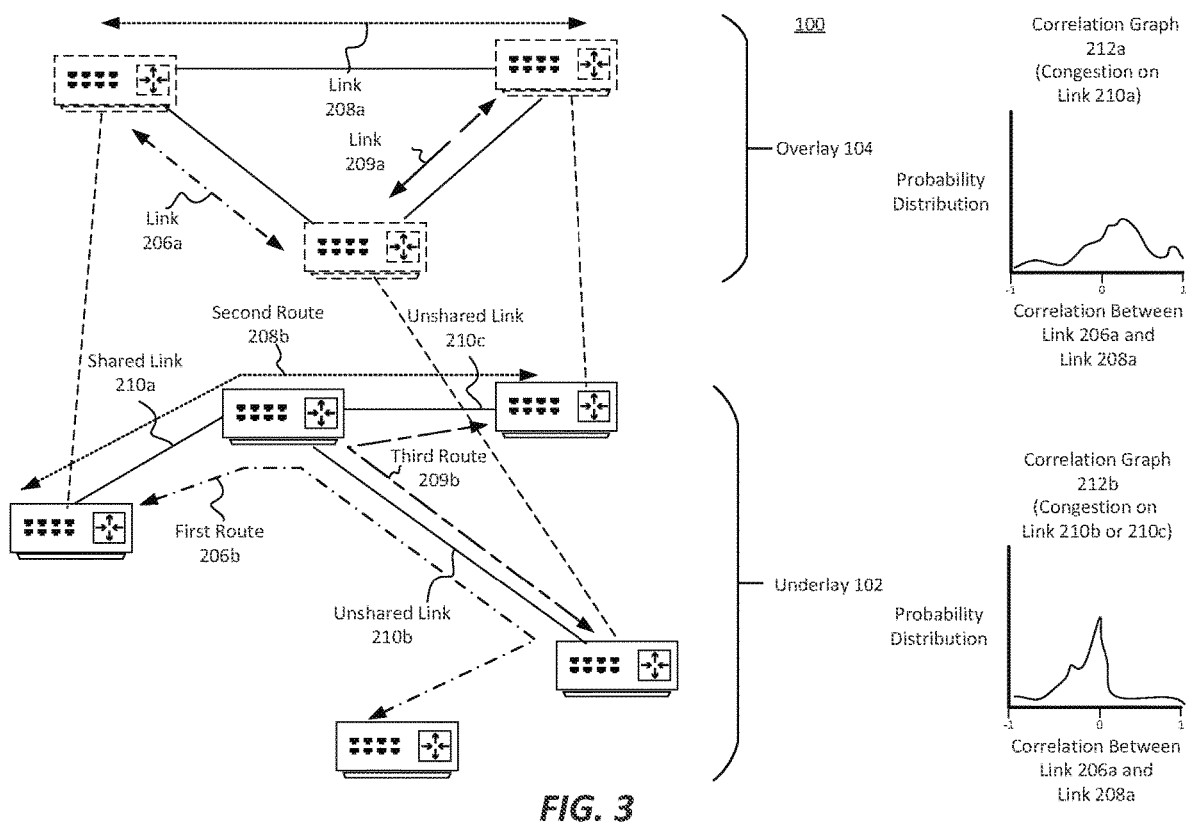
FIG. 3 illustrates correlations between flows at various points within an example SD-WAN.

FIG. 3 illustrates correlations between SD-WAN links at various points within an example SD-WAN. SD-WAN 100 further illustrates correlations of SD-WAN links based on underlay network topology. SD-WAN 100 includes three SD-WAN links 206a, 208a, and 209a, each of which correspond to respective underlay routes 206b, 208b, and 209b. Correlation graphs 212 show expected probability distributions of correlations between SD-WAN link 206a and SD-WAN link 208a when congestion occurs at various physical links across the network.

As discussed in relation to FIG. 1, SD-WAN links in overlay 104 may not intuitively correspond to routes in underlay 102. Separate SD-WAN links 206a and 208a overlap in underlay 102 at shared link 210a. Although a superficial inspection of the topology of overlay 104 (which may be the only topology information available to a SD-WAN controller such as a network orchestrator) indicates that SD-WAN link 206a is unrelated to SD-WAN link 208a, respective corresponding routes 206b and 208b may, in fact, not be disjoint. When network traffic congestion (including buffering, dropped packets, etc.) increases at a shared link 210a, a correlation between SD-WAN links using the shared physical link 210a increases.

A network orchestrator of SD-WAN 100 may request network probes to determine delay times across routes of the SD-WAN links of SD-WAN 100, as described in relation to FIG. 1. The time-series delay data received from various SDN enabled devices in SD-WAN 100 can be used to analyze the correlations between various SD-WAN links. The network orchestrator may create a correlation matrix, where each position in the matrix corresponds to a pairwise comparison of two SD-WAN links of SD-WAN 100. For example, SD-WAN link 206a may be compared with SD-WAN link 208a using a linear regression algorithm. The output of the linear regression algorithm is a number between −1 and +1, where +1 shows perfect direct (increasing) linear relationship between the time-series delay of the two links and −1 shows a perfect inverse (decreasing) linear relationship. When the correlation is high (closer to +1) the two links might share a congested underlay link or might each share a congested underlay link with a third flow.

In a situation where a pair of SD-WAN links shares a congested physical link, the congestion across the shared link may substantially contribute to the delay times of the network probes for each SD-WAN link of the pair. For example, if only shared link 210a is congested, delay times for SD-WAN link 206a and SD-WAN link 208a will both increase. The coordinated increase in delay times for both SD-WAN link 206a and SD-WAN link 208a may cause an increase in the correlation between SD-WAN link 206a and SD-WAN link 208a. Correlation graph 212a shows a probability distribution of correlations between SD-WAN link 206a and SD-WAN link 208a when there is congestion on shared link 210a. The probability distribution for these direct overlaps favors a positive correlation, with a bump in probability near +1 correlation.

Alternatively, if only unshared link 210b is congested, delay times for SD-WAN link 206a will increase, but delay times for SD-WAN link 208a will not increase. The uncoordinated increase in delay times for SD-WAN link 206a but not SD-WAN link 208a may cause a decrease in the correlation between SD-WAN link 206a and SD-WAN link 208a. Correlation graph 212b shows a probability distribution of correlations between SD-WAN link 206a and SD-WAN link 208a when there is congestion on unshared link 210b or 210c. The probability distribution favors a negative correlation with a large spike at 0 correlation.

A third situation can impact the correlation between a pair of SD-WAN link. If a third SD-WAN link 209a shares one physical link 210b with the SD-WAN link 206a and another physical link 210c with the SD-WAN link 208a, the third SD-WAN link 209a may cause congestion on both links 210b and 210c in a way that causes the delay times across SD-WAN link 206a and SD-WAN link 206b to increase in a coordinated manner, even if SD-WAN link 206a and SD-WAN link 206b are disjoint in underlay 102 (not shown in FIG. 2). The indirect overlap results in a correlation graph for a pair of SD-WAN link influenced by another SD-WAN link that is quite similar to correlation graph 212a, except that the bump near +1 correlation disappears.

Even though indirect overlap and direct overlap are different routing phenomena, it is not necessary to filter out the indirect overlaps. There is not a significant difference in network performance if the indirect overlaps are filtered out versus if they are accounted for in the same way as direct overlaps. This is partially due to the fact that indirect overlaps (SD-WAN link 206a indirectly overlaps with SD-WAN link 208a because of the shared influence of SD-WAN link 209a) reinforce direct overlaps (SD-WAN link 206a shares link 210b with SD-WAN link 209a, and SD-WAN link 208a shares link 210c with SD-WAN link 209a).

Figure 4:
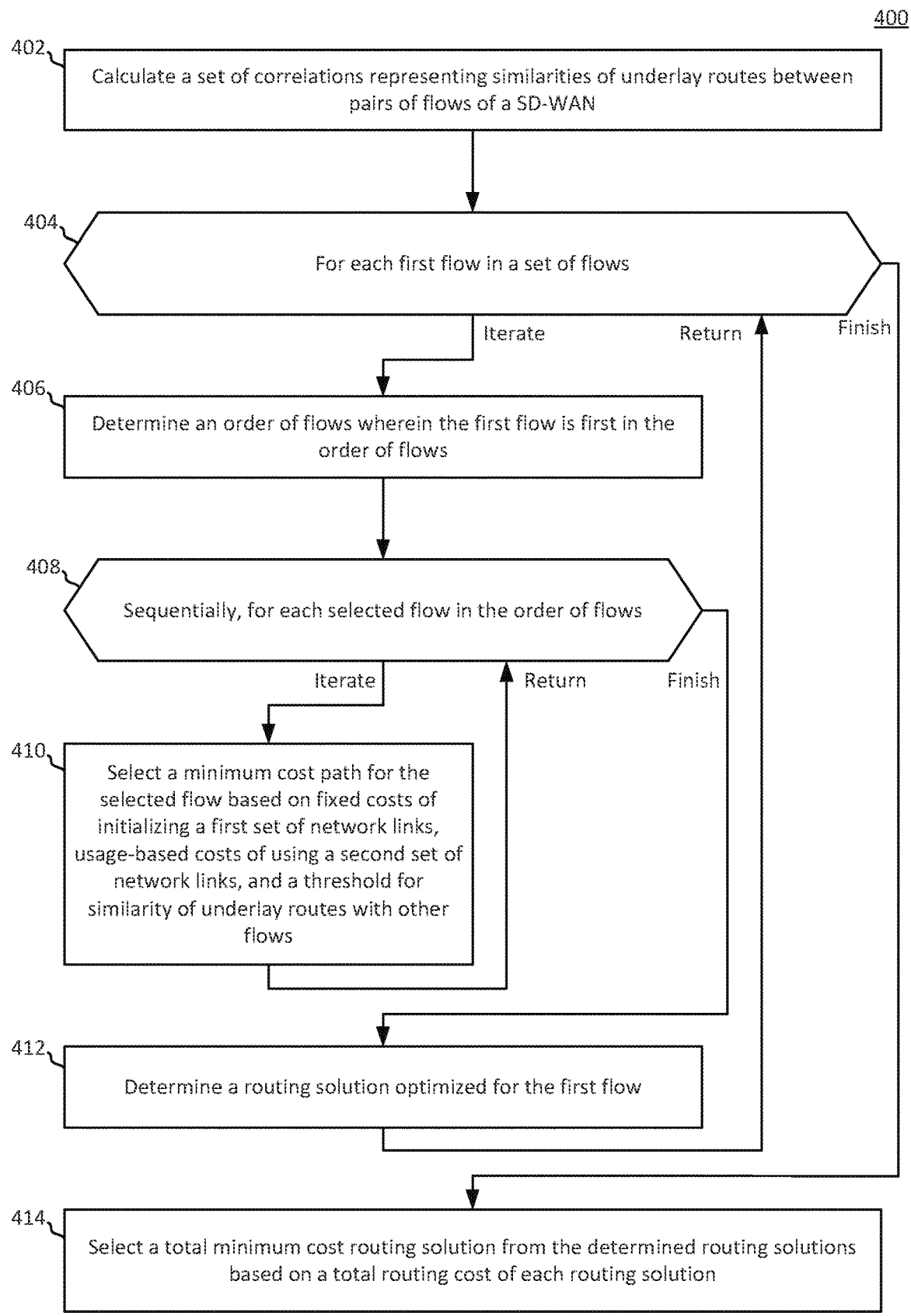
FIG. 4 is a flowchart illustrating an example method for reconfiguring SD-WAN routes.

FIG. 4 is a flowchart illustrating an example method 400 for reconfiguring SD-WAN routes. This example method may be executed on a network orchestrator service running in the SD-WAN or on a cloud device.

In block 402 a set of correlations is calculated between pairs of links of the SD-WAN. Each correlation represents a similarity of underlay routes. In some examples, a highly positive correlation represents two SD-WAN links that share a congested physical link (direct overlap) or independently share physical links with a third SD-WAN link that is causing congestion across multiple physical links (indirect overlap). The set of correlations may be saved in a correlation matrix, where an entry in the correlation matrix corresponds to a correlation between a certain pair of SD-WAN links.

In block 404, each flow in a set of flows of the SD-WAN is selected, and a routing solution is determined optimized for the selected flow in blocks 406-412. A routing solution is a set of minimum cost paths through the SD-WAN for each flow of the SD-WAN. The minimized cost is an operational business cost for using certain links in the underlay network. For each flow, method 400 follows the iterate path of block 404 until execution returns to block 404 by the return path. Once all flows have iterated, execution follows the finish path of block 404. In some examples, the order of flows selected is determined based on network health. For example, if a flow is not meeting its QoS requirements, it may be ordered before flows that are meeting their QoS requirements. In some examples, the set of flows is a subset of all flows in the SD-WAN, such as flows that are new and/or flows that disrupted by a network change.

In block 406, an order of flows is determined for executing the algorithm to generate the routing solution. The selected first flow is placed first in the order of flows. In some examples, the order of flows is maintained based on flow ID in a master flow table, and the start of execution of the algorithm is offset to start at the currently selected flow. Similarly to block 404, the order of flows may be maintained based on network health parameters. In some examples, the order of flows is a subset of all flows in the SD-WAN, such as flows that are new and/or flows that disrupted by a network change.

In block 408, a flow is selected iteratively in the order of flows. For each flow, method 400 follows the iterate path of block 408 until execution returns to block 408 by the return path. Once all flows have iterated, execution follows the finish path of block 408. Resultantly, for each iteration of block 404, which creates a routing solution optimized to a selected flow, block 408 creates a minimum cost path for every flow of the SD-WAN for inclusion in each routing solution created in each iteration of block 404. The result is a set of routing solutions optimized for every flow of the SD-WAN.

In block 410, a minimum cost path is selected for the selected flow of block 408 based on fixed costs of initializing a first set of network underlay links, usage-based costs of using a second set of network underlay links, and a threshold for similarity of underlay routes for the selected SD-WAN links. For example, a video streaming flow with a high QoS requirement may set a maximum threshold of +0.6 correlation for SD-WAN links used for the flow. Therefore, all SD-WAN links that have greater than +0.6 correlation with any other SD-WAN link would be eliminated for consideration before a minimum cost path is determined for the flow. In some examples, each minimum cost path for the routing solution may be calculated using a minimum cost path algorithm such as, for example, an algorithm based on Dijkstra's algorithm.

In block 412, the minimum cost paths for each flow, as determined in block 410, are used to determine a routing solution optimized for the first flow. In some examples, the routing solution includes the minimum cost paths for each flow. In certain examples, a total routing cost is calculated for the routing solution, which may correspond to a total business cost to the owner of the SD-WAN for operating the SD-WAN links for a certain period of time.

In block 414, a total minimum cost routing solution is selected from the routing solutions determined in block 412. The selection of the total minimum cost routing solution is based on a total routing cost of each routing solution determined in block 412. In some examples, the total routing cost for each routing solution is calculated in block 414. Once the total minimum cost routing solution is selected, it may be implemented on the SD-WAN. In some examples, the network orchestrator issues updated flow rules to reconfigure the flows across SD-WAN links.

Figure 5:
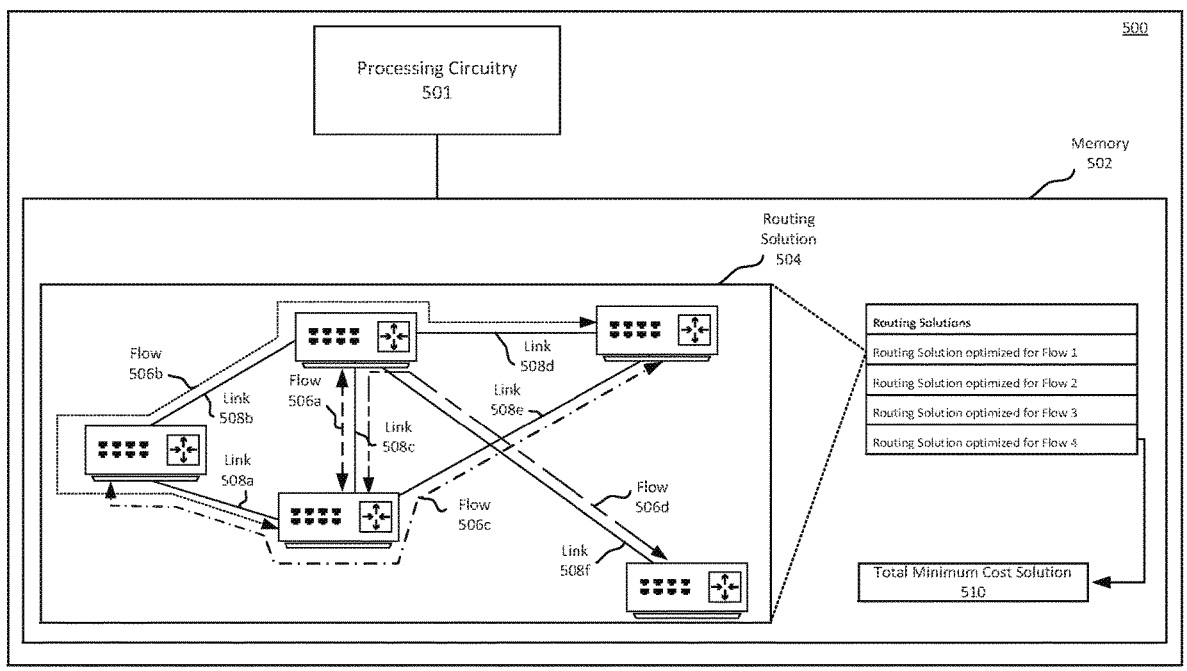
FIG. 5 illustrates an example network orchestrator including instructions to reconfigure SD-WAN routes.

FIG. 5 illustrates an example network orchestrator including instructions to reconfigure SD-WAN routes. Network orchestrator 500 includes processing circuitry 501 and memory 502. Memory 502 includes routing solutions 504, a total minimum cost routing solution 510, and instructions for determining routing solutions and the total minimum cost routing solution (not shown). Network orchestrator 500 may be a physical device, as illustrated in FIG. 5, or may be deployed as a cloud service, network service, virtualized device, or any other appropriate deployment method.

An example routing solution 504 is illustrated in FIG. 5. Routing solution 504 includes a network model of the SD-WAN from the overlay perspective. SDN enabled devices are connected via SD-WAN links 508, and flows 506 traverse paths on the overlay network. For example, flow 506a traverses link 508c.

Once a link order is determined, the routing solution is determined based on Formula 1.

$$\min\left(\sum_{t \in I}\sum_{(i,j) \in E_0} \alpha_{ij,t}\lambda_{ij,t} + \sum_{t \in I}\sum_{(i,j) \in E_0} \zeta_{ij,t}\sum_{h \in H} x^h_{ij,t} \cdot d_h\right) \quad \text{Formula 1}$$

Formula 1 describes a minimization of link costs across the SD-WAN. Link costs comprise two types of cost, static costs ($\sum_{t \in I}\sum_{(i,j) \in E_0}\alpha_{ij,t}\lambda_{ij,t}$) and dynamic costs ($\sum_{t \in I}\sum_{(i,j) \in E_0}\zeta_{ij,t}\sum_{h \in H}x^h_{ij,t}\cdot d_h$). Static costs are the sum across each physical link t, such as each WAN uplink, and across each SD-WAN link (i,j) using the physical link t, of the static cost $\alpha_{ij,t}$ for initializing the physical link multiplied by a binary variable $\lambda_{ij,t}$ indicating whether SD-WAN link (i,j) is routing any flow in the routing solution.

Dynamic (or usage-based) costs are the sum across each physical link t, such as each WAN uplink, and across each SD-WAN link (i,j) using the physical link t, of the bandwidth cost rate $\zeta_{ij,t}$ of SD-WAN link (i,j) on physical link t, multiplied by the total amount of bandwidth across SD-WAN link (i,j) on physical link t. The total amount of flow is calculated by summing across all flows H, the amount of bandwidth $d_h$ demanded by flow h multiplied by a binary variable $x^h_{ij,t}$ representing whether flow h is being routed through link (i,j) in the routing solution.

Formula 1 is further subject to various constraints, including not exceeding SD-WAN link capacity, network traffic must be balanced on the input and output sides of an SD-WAN device (taking into account consumption and generation of network traffic by the device itself), traffic passing through a physical link cannot exceed the link's capacity, and SD-WAN link capacity cannot exceed the maximum capacity of any of the respective physical links.

Another constraint that Formula 1 is subject to is Formula 2.

$$\sum_{t \in I}\sum_{t' \in I}\sum_{ij \in E_0}\sum_{mn \in E_0} x^h_{ij,t} \cdot \lambda_{mn,t'} \cdot CM((ij,t),(mn,t')) \leq \Omega_h, \quad \text{Formula 2}$$

$$\forall h \in H$$

Formula 2 constrains any flow h in SD-WAN flows H to only use SD-WAN links with a correlation less than a correlation threshold $\Omega_h$. Specifically, the correlation for a flow h is determined by comparing pairs of SD-WAN links ij on interface t and mn on interface t'. For each SD-WAN link ij on interface t determined to have flow h routing through it ($x_{ij,t}^h$), and for each SD-WAN link mn on interface t' that has at least one of flows H routing through it ($\lambda_{mn,t'}$) and is not the same link as ij, retrieve the correlation of links ij,t and mn,t' from the correlation matrix CM((ij,t), (mn,t')) and sum all retrieved correlations together. In some examples, the summed correlations are divided by the number of retrieved correlations to determine a per-link pair correlation to compare to the threshold. In some other examples, the summed correlations are directly compared to the threshold.

More specifically, minimum cost network reconfiguration can be solved using the following problem formulation along with any ILP solver such as gurobi optimization toolkit or CPLEX.

$$\text{minimize} \sum_{t \in I} \sum_{i,j \in E_o} \alpha_{ij,t} \cdot \lambda_{ij,t} + \sum_{t \in I} \sum_{ij \in E_o} \zeta_{ij,t} \sum_{h \in H} x_{i,j,t}^h \cdot d_h \quad \text{Formula 3}$$

subject to $$\sum_{h \in H} (x_{ij,t}^h + x_{ji,t}^h) \cdot d_h \leq c_{ij,t}, \quad \forall (i,j) \in E_o, \forall t \in I \quad (3a)$$

$$\sum_{t \in I} \sum_{j \in V_o} x_{ij,t}^h = \sum_{t \in I} \sum_{k \in V_o} x_{ki,t}^h + \text{sign}(b_i^h), \quad \forall i \in V_o, \forall h \in H \quad (3b)$$

$$\sum_{h \in H} \sum_{j \in V_o} (x_{ij,t}^h) \cdot d_h \leq c_{i,t}, \quad \forall i \in V_o, \forall t \in I \quad (3c)$$

$$\sum_{h \in H} \sum_{j \in V_o} (x_{ji,t}^h) \cdot d_h \leq c_{i,t}, \quad \forall i \in V_o, \forall t \in I \quad (3d)$$

$$c_{ij,t} \leq c_{i,t}, \quad \forall (i,j) \in E_o, \forall t \in I \quad (3e)$$

$$c_{ij,t} \leq c_{j,t}, \quad \forall (i,j) \in E_o, \forall t \in I \quad (32f)$$

$$\lambda_{ij,t} \geq \frac{\sum_{h \in H} [x_{ij,t}^h]}{|H|}, \quad \forall t \in I, \forall (ij) \in E_o \quad (3g)$$

$$\sum_{t \in I} \sum_{t' \in I} \sum_{h' \in H, h' \neq h} \sum_{(m,n) \in E_o} \sum_{(i,j) \in E_o} x_{ij,t}^h \cdot$$

$$x_{mn,t'}^{h'} \cdot \text{corr}(x_{ij,t}^h, x_{mn,t'}^{h'}) \leq \Omega_h, \forall h \in H \quad (3h)$$

$$x_{ij}^h, \lambda_{ijt} \in \{0, 1\}, \quad \forall (i,j) \in E_o, \forall h \in H \quad (3i)$$

Formula 3 describes, in detail, the goal of minimum cost network reconfiguration, as well as various constraints (3a-3i) limiting the possible solutions of the minimum cost network reconfiguration. The left hand side of Formula 3 corresponds to the fixed cost of turning each link on and the right hand side corresponds to the variable bandwidth cost of each link for all flows that pass through it. The first constraint (3a) shows the link capacity constraint and the second constraint (3b) is the flow balance constraint (i.e. the total flow out of a node is equal to the summation of total flows that comes into a node and the net glow generated/consumed at the node). Constraints (3c) and (3d) specify that the total flow going out/in a node for interface t is bounded by the capacity of interface t on node i (i.e. $c_{i,t}$). Constraints (3e) and (3f) show that the capacity of the overlay link (ij) for interface t is the minimum of $c_{i,t}$ and $c_{j,t}$. In addition to the link capacity and flow balance constraints (3a) and (3b), binary variable $\lambda_{ij,t}$ specifies whether a link is being used in the route for at least one of the flows (when $\lambda_{ij,t}=1$) or not (when $\lambda_{ij,t}=0$). Constraint (3g) ensures that $\lambda_{ij,t}$ is set to 1 when at least one of the flows use link (i,j) on interface t. Constraint (3h) is the QoS constraint and indicates that the new route should not interfere with the exiting flows more than a specified threshold $\Omega_h$. In summary, Formula 3 minimizes the weighted total disruption impact such that all the flows can be routed subject to link capacity and QoS constraint.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" can often describe both the classification of packets to a flow pattern, as well as the path those classified packets take through the SDN overlay network. "Routes" more often refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A network orchestrator, comprising:
processing circuitry; and
a memory including instructions that, when executed by the processing circuitry, cause the network orchestrator to:
receive, from a set of network infrastructure devices, network probe information including delay times of network probes associated with a set of flows between devices of the set of network infrastructure devices;
generate a correlation matrix including correlations representing shared congested links between pairs of flows of the set of flows, wherein the correlations are calculated based on the delay times of the network probes;
for each flow of the set of flows, determine a routing solution optimized for the each flow, wherein the routing solution includes minimum cost routing paths for all flows of the set of flows, based in part on a shared congested link threshold, and wherein the minimum cost routing paths are determined using an algorithm constrained by a maximum correlation threshold between flows;
select a total minimum cost solution from the determined routing solutions based on a total routing cost of each routing solution.

2. The network orchestrator of claim 1, wherein a minimum cost routing path for a certain flow is determined based on costs for physical links between devices of the set of network infrastructure devices, and wherein the costs for the physical links have been updated based on minimum cost routing paths of flows already calculated for the routing solution.

3. The network orchestrator of claim 1, wherein highly positive correlations represent direct shared links and indirect shared links.

4. The network orchestrator of claim 3, wherein a pair of flows has direct shared links when both of the pair of flows transmit network traffic across the same link, and the pair of flows has indirect shared links when each of the pair of flows directly shares a link with a certain other flow, but not with one another.

5. A method, comprising:
calculating a set of correlations, each correlation representing a similarity of underlay routes between pairs of flows of a set of flows of a software defined wide area network (SD-WAN);
for each flow of the set of flows, determining a routing solution optimized for the each flow by:
determining an order of flows wherein the each flow is first in the order of flows, and
sequentially selecting a minimum cost path for each flow in the order of flows and updating network link capacity information based on the selected minimum cost path for the each flow, wherein the minimum cost path is selected based on:
fixed costs of initializing a first set of network links,
usage-based costs of using a second set of network links, and
a threshold for similarity of underlay routes with other flows, wherein the threshold is a maximum correlation threshold between flows that constrains the minimum cost path; and selecting a total minimum cost routing solution from the determined routing solutions based on a total routing cost of each routing solution.

6. The method of claim 5, further comprising receiving, from a set of SD-WAN infrastructure devices, delay times for network probes assigned to flows of the set of flows and forwarded between the SD-WAN infrastructure devices.

7. The method of claim 6, wherein highly positive correlations correspond to substantial portions of delay times being due to the respective pair of flows both routing network traffic through a shared congested underlay link.

8. The method of claim 6, wherein highly positive correlations correspond to substantial portions of delay times being due to the respective pair of flows both routing network traffic through respective congested underlay links shared with another flow.

9. The method of claim 5, wherein a third set of network links includes a subset of the first set of network links and a subset of the second set of links, and each link of the third set of network links has a fixed initialization cost and a usage-based cost.

10. A software defined wide area network (SD-WAN), comprising:
a plurality of network infrastructure devices; and
a SD-WAN network orchestrator configured to:
receive, from the plurality of network infrastructure devices, network probe information including delay times of network probes associated with a set of SD-WAN flows between devices of the plurality of network infrastructure devices;
generate a correlation matrix including correlations representing shared congested links between pairs of flows of the set of SD-WAN flows, wherein the correlations are calculated based on the delay times of the network probes;
for each flow of the set of SD-WAN flows, determine a routing solution optimized for the each flow by:
determining an order of flows wherein the each flow is first in the order of flows, and
sequentially selecting a minimum cost path for each flow in the order of flows and updating network link capacity information based on the selected minimum cost path for the each flow, wherein the minimum cost path is selected based in part on shared congested links between the each flow and other flows of the set of SD-WAN flows, and wherein the minimum cost path is selected based in part on a maximum correlation threshold between flows that constrains the minimum cost path; and
select a total minimum cost routing solution from the determined routing solutions based on a total routing cost of each routing solution.

11. The SD-WAN of claim 10, wherein selecting a minimum cost path for each flow comprises iteratively executing a minimum cost path algorithm for each flow of the set of SD-WAN flows that accounts for quality of service and link bandwidth thresholds.

12. The SD-WAN of claim 11, wherein after each iteration of the minimum cost path algorithm, cost and bandwidth usage is updated for each link of the SD-WAN.

13. The SD-WAN of claim 11, wherein a link bandwidth threshold of a SD-WAN link is set to zero when a network failure has occurred in a physical underlay route representing the SD-WAN link.

14. The SD-WAN of claim 10, wherein the SD-WAN network orchestrator is a service executed on a cloud device.

* * * * *